(12) United States Patent
Golen et al.

(10) Patent No.: US 11,440,492 B2
(45) Date of Patent: Sep. 13, 2022

(54) SEAT MODULE

(71) Applicant: HI-LEX CONTROLS, INC., Rochester Hills, MI (US)

(72) Inventors: Heather Ann Golen, Fenton, MI (US); Kevin Richard Koneval, Macomb, MI (US)

(73) Assignee: HI-LEX CONTROLS, INC., Rochester Hills, MI (US)

( * ) Notice: Subject to any disclaimer, the term of this patent is extended or adjusted under 35 U.S.C. 154(b) by 0 days.

(21) Appl. No.: 17/236,188

(22) Filed: Apr. 21, 2021

(65) Prior Publication Data

US 2022/0055553 A1 Feb. 24, 2022

Related U.S. Application Data

(63) Continuation-in-part of application No. 16/998,538, filed on Aug. 20, 2020, now Pat. No. 11,285,892.

(51) Int. Cl.
*H02G 3/02* (2006.01)
*B60R 16/02* (2006.01)

(52) U.S. Cl.
CPC ............ *B60R 16/0215* (2013.01); *H02G 3/02* (2013.01)

(58) Field of Classification Search
CPC ............................ B60R 16/0215; H02G 3/02
USPC ........................................................ 174/72 A
See application file for complete search history.

(56) References Cited

U.S. PATENT DOCUMENTS

| | | | |
|---|---|---|---|
| 6,429,544 B1 | 8/2002 | Sasaki et al. | |
| 8,226,145 B2 | 7/2012 | Kasuya et al. | |
| 8,957,311 B2 | 2/2015 | Shimada | |
| 9,039,081 B2* | 5/2015 | Arefi | B60R 16/0215 297/217.3 |
| 9,481,327 B2 | 11/2016 | Shibata et al. | |
| 9,878,680 B2* | 1/2018 | Mita | B60N 2/68 |
| 10,252,651 B2* | 4/2019 | Bhatia | B60N 2/20 |

(Continued)

FOREIGN PATENT DOCUMENTS

FR 3030391 A3 6/2016
JP 3868749 B2 1/2007

(Continued)

OTHER PUBLICATIONS

International Search Report and Written Opinion of PCT/US2021/043886, dated Nov. 15, 2021.

*Primary Examiner* — Timothy J Thompson
*Assistant Examiner* — Michael F McAllister
(74) *Attorney, Agent, or Firm* — Dickinson Wright PLLC (57) ABSTRACT

A seat module adapted to be attached to a seat having mechanical parts and electric devices for seat operation in a motor vehicle includes at least one operating cable for activating at least one device, and a cushion suspension module adapted to support a cushion of the seat having a plurality of cushion suspension wires for attaching to the seat and at least one module plates coupled with the cushion suspension wires. An end portion of the operating cable is temporarily stowed on the cushion suspension module in a pre-assembled state where the operating cable is attached to the cushion suspension module, and the end portion of the operating cable is connected to the electric devices and/or mechanical parts of the seat in an assembled state where the cushion suspension module with the attached operating cables is securely mounted to the seat.

20 Claims, 10 Drawing Sheets

(56) References Cited

U.S. PATENT DOCUMENTS

| | | | |
|---|---|---|---|
| 11,230,238 B2* | 1/2022 | Kajihara | B60R 16/037 |
| 2003/0098661 A1* | 5/2003 | Stewart-Smith | B60N 2/0248 |
| | | | 318/445 |
| 2008/0265649 A1 | 10/2008 | McMillen et al. | |
| 2010/0027232 A1* | 2/2010 | Kasuya | B60R 16/0215 |
| | | | 361/807 |
| 2013/0119741 A1* | 5/2013 | Medoro | B60R 11/0264 |
| | | | 297/452.18 |
| 2013/0146354 A1 | 6/2013 | Shimada | |
| 2017/0283068 A1* | 10/2017 | Udriste | H04W 4/80 |
| 2017/0313222 A1* | 11/2017 | Line | B60N 2/7005 |
| 2018/0072199 A1 | 3/2018 | Strumolo et al. | |
| 2019/0031121 A1 | 1/2019 | Sato | |

FOREIGN PATENT DOCUMENTS

| | | | |
|---|---|---|---|
| JP | 201266364 A | 4/2012 | |
| JP | 5410041 B2 | 2/2014 | |
| JP | 5960310 B2 | 8/2016 | |
| WO | 2010076479 A1 | 7/2010 | |
| WO | 2012144660 A1 | 10/2012 | |
| WO | 2016012678 A1 | 1/2016 | |

\* cited by examiner

SEAT MODULE

CROSS-REFERENCE TO RELATED APPLICATION

This application is a continuation-in-part of U.S. patent application Ser. No. 16/998,538, filed Aug. 20, 2020, the entire contents of which are incorporated herein by reference.

TECHNICAL FIELD

This present disclosure relates to a seat module that employs operating cables to control devices potentially suited for various application but in a preferred implementation is utilized in an automotive seat assembly.

BACKGROUND

The statements in this section merely provide background information related to the present disclosure and may not constitute prior art.

Mechanical control cables for seat actuation and wire harnesses for electrical communication with electric devices are directly mounted to a seat frame in an automotive seat. The mechanical control cables and the wire harnesses are routed one by one when they are connected to mechanical parts such as levers or latch systems and electrical components such as a seat occupant sensor in the automotive seat. For example, in an ordinary conventional seat of a motor vehicle, each of the mechanical control cables and wire harnesses is individually fastened to a bracket by binder members such as zip ties, harness clips, or adhesive tapes for retaining the control cables and/or wire harnesses in their routed positions. Thus, each of the control cables and/or wire harnesses is independently retained in a seat frame with its predetermined shape respectively.

The conventional seat assembly with the mechanical control cables and/or the wire harnesses requires a large number of brackets and binder members for retaining the cables and wire harnesses to the seat frame, and a bothersome operation of attaching many components to the seat frame such that the seat assembly is a long and awkward assembly process with greater variability. For example, changes in the position of the mechanical control cable conduit affect the length of a core wire within each of the mechanical control cables. If the core wire is too short or too long when the mechanical control cables are attached to the seat frame, seat actuation may not be achievable so that the mechanical control cables need to be rerouted and reattached. This is a disadvantage for the conventional assembly process of the seat with the mechanical control cables.

In addition, it is necessary to attach the mechanical control cables and/or the wire harnesses to the lower part of the seat through a limited space enclosed by seat rails, metal brackets, various mechanism components, and already attached mechanical and/or electrical parts. Therefore, longer working process time for the attachment and many numbers of parts including binder members are needed for connecting the mechanical control cables and the wire harnesses to the mechanical and electrical parts, respectively. Especially in attachment of the mechanical control cables and the wire harnesses to the lower part of the seat, the control cables and wire harnesses have many penetrated arranging spots, and furthermore need to be arranged within the limited space as described above. For this reason, poor arranging workability will be presented, causing possible damage by involvement of the mechanical control cables and the wire harnesses, etc.

As described above, the ordinary seat assembly with the mechanical control cable and/or the wire harness includes the retaining members such as brackets or zip-ties for attaching the cables and/or the wire harnesses to the seat frame. The ordinary seat assembly with the retaining elements for the mechanical control cables and the wire harnesses will have more manufacturing steps. Accordingly, there is constantly a desire to simplify the assembled components and steps of the ordinary seat assemblies with the mechanical control cables and the wire harnesses. In addition, there is more desire to reduce cost and weight of automotive components, while providing a desirable durability, low warranty claims, and compliance with performance requirements.

SUMMARY

The present disclosure relates to a seat module retaining operating cables such as mechanical control cables and wire harnesses utilized in an automotive seat assembly. In particular, the present disclosure relates to the seat module temporarily stowing end portions of the operating cables in a pre-assembled state, and the stowed end portions of the operating cables are released and connected to mechanical parts and/or electric devices for the seat operation in an assembled state after the seat module is securely mounted to the seat.

By using the seat module, the mechanical control cables and/or the wire harnesses can be shipped to the customer in the pre-assembled state in their routed condition by retaining the cables to a cushion suspension module. In the pre-assembled state, furthermore, the loose end portions of the control cables and/or the wire harnesses may be temporarily stowed prior to shipment to reduce tangling and improve assembly at the customer site. The customer can attach the seat module to the seat frame with the end portions, which are still stowed in the cushion suspension module. Then the customer un-stows the end portions and connects the end portions to the mechanical parts (e.g., levers and latch mechanisms) and/or the electric devices (e.g., a seat occupant sensor) as needed in the assembled state. This eliminates the need for attaching brackets and zip ties for retaining the control cables and/or the wire harnesses to the seat frames. In addition, repeatability of routing is greatly improved, and also ensuring seat operation is achieved.

According to an aspect of the present disclosure, a seat module adapted to be attached to a seat having at least one device for seat operation in a motor vehicle includes at least one operating cable configured to activate one of the at least one device and a cushion suspension module adapted to support a cushion of the seat. The cushion suspension module includes a plurality of cushion suspension wires for attaching to the seat, and at least one module plate coupled with the plurality of cushion suspension wires and formed with a retention feature for attaching the at least one operating cable. Further, an end portion of the operating cable is temporarily stowed on the cushion suspension module in a pre-assembled state where the operating cable is attached to the cushion suspension module, and the end portion of the operating cable is connected to the devices attached to the seat in an assembled state where the cushion suspension module with the attached operating cable is securely mounted to the seat.

According to a further aspect of the present disclosure, the end portion of the operating cable stowed in the pre-assembled state is retained in the module plate while the cushion suspension module is mounted to the seat, and is released for connecting to the at least one device attached to the seat in the assembled state of the cushion suspension module. The retention feature is formed as a mechanical-lock type and located in at least one location of the module plates for retaining the operating cable. Further, the retention feature of the cushion suspension module is configured to position each of the operating cables in a pre-defined location of the seat in the assembled state.

According to a further aspect of the present disclosure, the cushion suspension module includes a stowing feature formed in at least one location of the module plate for temporarily retaining the end portion of the operating cable in the pre-assembled state and allowing the end portion of the operating cable to be released for connecting to the devices attached to the seat in the assembled state. The stowing feature is formed a mechanical-lock type for releasably retaining the end portion of the operating cables.

According to a further aspect of the present disclosure, the end portion of the operating cables is temporarily stowed by tucking under or above one of the operating cables retained in the cushion suspension module in the pre-assembled state.

According to a further aspect of the present disclosure, the operating cables include wire harnesses for electrical communication with electric devices and mechanical control cables for actuation of mechanical parts. For example, each of the mechanical control cables controls mechanical actuators such as a lever and/or a latch mechanism, and each of the wire harnesses electrically communicates with a seat buckle, a seat occupant sensor, an electronic control unit (ECU), a heating device, and/or a blower assembly.

According to a further aspect of the present disclosure, the module plate is formed of a resin material or a composite material such as a glass woven plastic composite sheet.

According to a further aspect of the present disclosure, the seat module further includes an additional component retained in the cushion suspension module for actuating a power mechanism of the seat.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIG. 2 shows a plan view of a module plate in the seat module of FIG. 1, and FIGS. 2A and 2B show detailed views of stowing features of the module plate of FIG. 2;

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
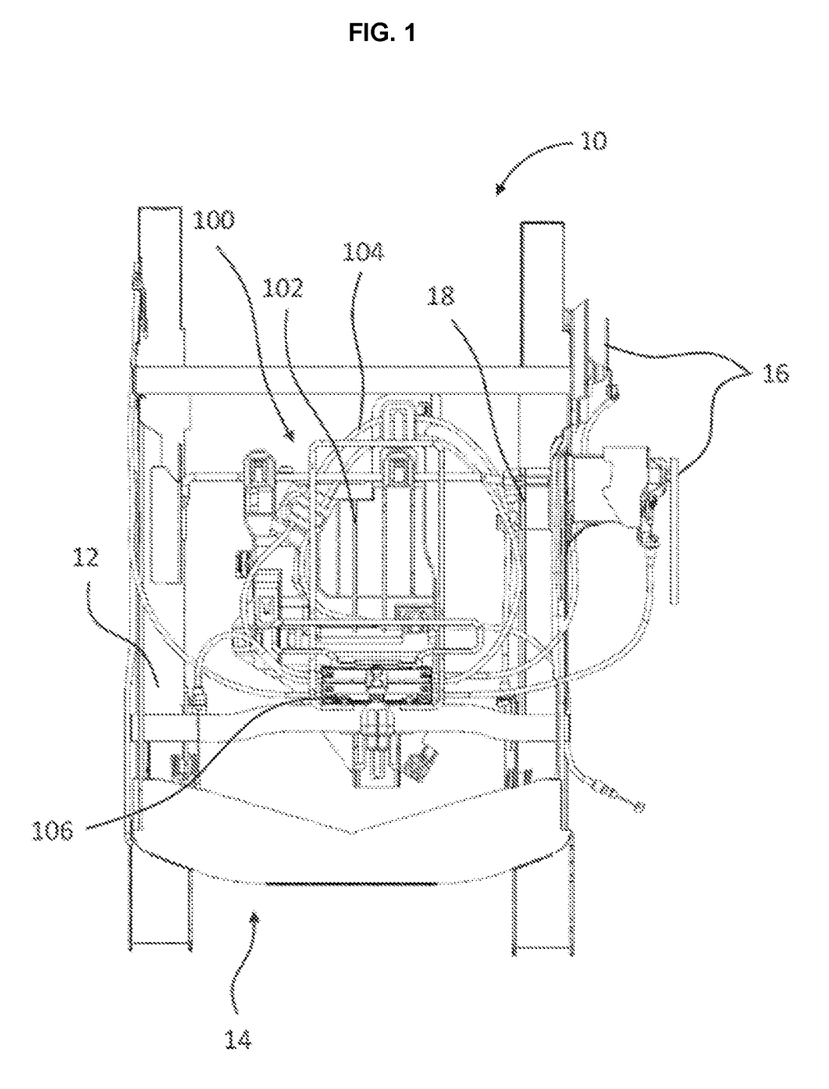
FIG. 1 shows a plan view of a seat module attached to a cushion frame in an automotive seat in accordance with an embodiment of the present disclosure.

FIG. 1 shows a lower part of a seat unit 10 for a motor vehicle. The seat unit 10 typically includes a pair of rails 12 adapted to be fixed to a floor pan (not shown) of the motor vehicle for back-and-forth motion and a seat cushion (not shown) attached to a cushion frame 14 for up-and-down motion, a seatback (not shown) attached to the cushion frame 14 above the rails 12, and mechanical parts 16 such as levers or latch systems coupled to the movable sections of the seat unit 10. The mechanical parts 16 are generally attached to the cushion frame 14 for adjusting the seat position and actuated by connected mechanical control cables 104. The seat unit 10 is generally designed to move the seat cushion backward, forward, upward, and downward with respect to the floor pan, and to cause the seatback to recline or fold such as a fold flat seat. The seat unit 10 further includes a seat module 100 attached to the cushion frame 14.

In FIG. 1, the seat module 100 includes a module plate 102 and at least one mechanical control cable 104. Generally, more than one mechanical control cables 104 are bundled together by a cable bundle housing 106, which is attached to the module plate 102, or each of the mechanical control cables 104 is individually attached to the module plate 102 without the cable bundle housing 106. As shown in FIG. 1, the seat module 100 is securely mounted to the cushion frame 14 under the seat cushion for controlling the mechanical parts 16, which were already installed to the seat unit 10 before the seat module 100 is attached to the cushion frame 14. The attached seat module 100 actuates the drive of the movable portions of the seat unit 10 such as a seat-cushion position and a reclining angle, which is mounted on the floor pan of the vehicle. In the seat unit 10, for example, the mechanical parts 16 for use with the seat module 100 having the mechanical control cables 104 are the levers and latch mechanisms associated with seat adjustment.

Figures 2, 2A, 2B:
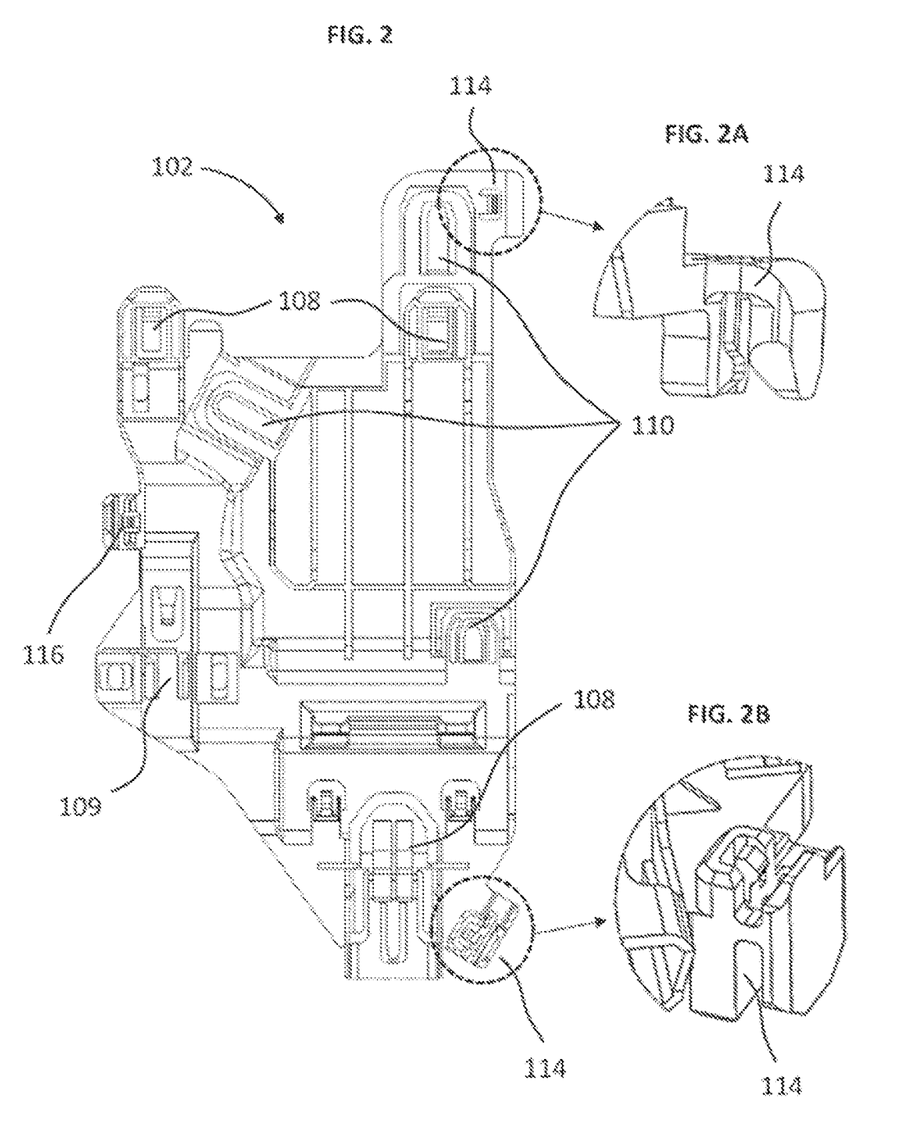

FIG. 2 illustrates the module plate 102 designed to fit within the given packaging space under the seat cushion and fixed to the cushion frame 14 of the seat unit 10. The structure, dimension, shape, material, and number of pieces, etc. of the module plate 102 are not particularly limited. In addition, the module plate 102 is generally made of a resin material or another material. The resin material is not particularly limited, and various resin materials may be used. According to an exemplary embodiment of the present disclosure, the module plate 102 of the seat module 100 is formed with a glass filled resin such as a Polypropylene (PP) or a Polyamide (PA), etc. The module plate 102 formed with the PP or PA has benefits for easy assembly and repeatability when the seat module 100 is attached to the seat unit 10.

According to other embodiment of the present disclosure, the module plate 102 of the seat module 100 is also formed of a composite material such as a glass woven plastic composite sheet (e.g. an organo sheet). In particular, when the seat module 100 formed of the glass woven plastic composite sheet is attached to the seat unit 10, the module plate 102 is itself structurally used in the seat unit 10 instead of metal components which structurally strengthens the seat unit 10. Accordingly, the module plate 102 with the attached mechanical control cables 104 also structurally supports the seat unit 10 in addition to providing with the organized mechanical control cables 104 for the seat actuation.

In FIGS. 1 and 2, the module plate 102 of the seat module 100 is attached to the cushion frame 14 of the seat unit 10 via a mounting feature 108, which is formed in multiple locations in the module plate 102. According to an exemplary embodiment of the present disclosure, the mounting feature 108 is formed as a mechanical-lock type such as a snap-fit or a press-fit for allowing the seat module 100 to be securely mounted to the cushion frame 14 of the seat unit 10. In FIGS. 1 and 2, for example, the mounting features 108 are located in three (3) locations for attaching the seat module 100 to the cushion frame 14 of the seat unit 10. However, the mounting features 108 may be formed with other types such as a rivet according to other embodiments of the present disclosure. Due to the mounting features 108 formed in the module plate 102, the seat module 100 with the mechanical control cables 104 is securely mounted to the cushion frame 14 of the seat unit 10 for the seat actuation. In addition, as shown in FIG. 2, the module plate 102 includes a holding feature 109 for attaching additional components such as a seat actuator 118 (see FIG. 3A) or a wire harness, etc. The attached seat actuator 118 is configured to electrically control or adjust the seat position with a power mechanism 18 installed in the seat unit 10.

Figures 3, 3A:
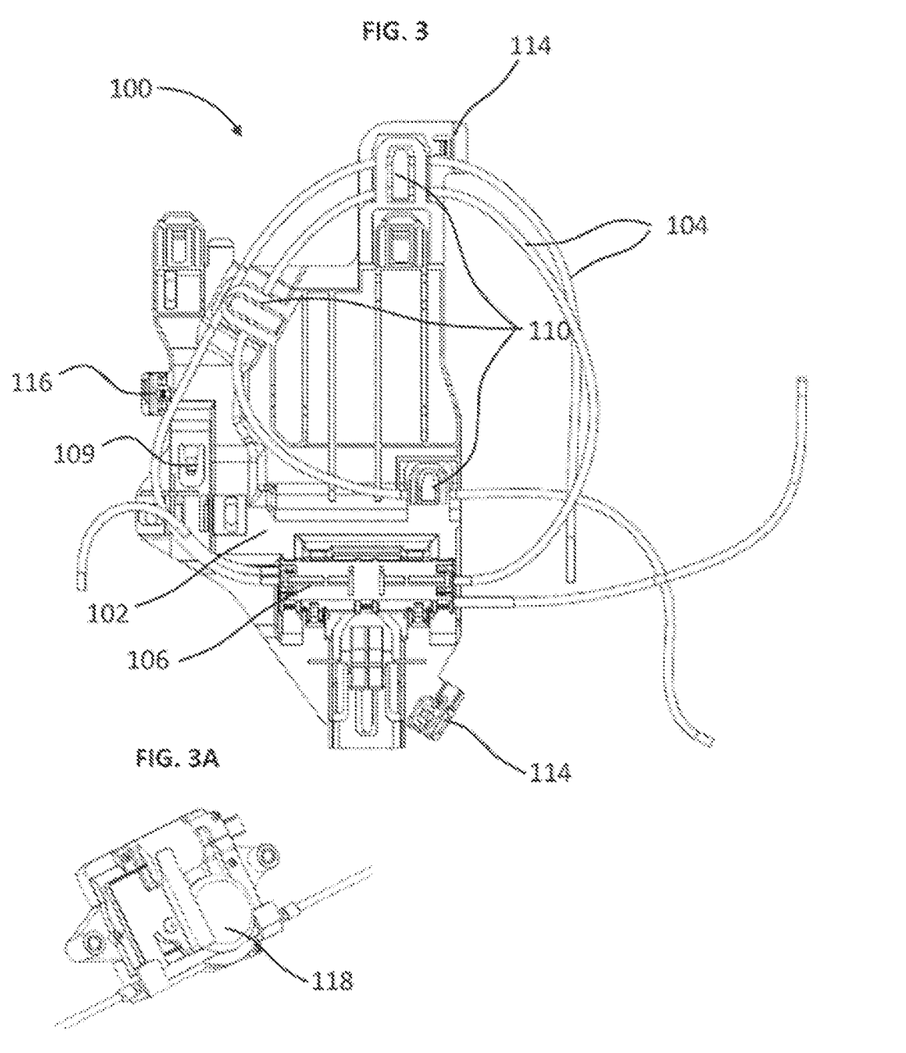
FIG. 3 shows a plan view of mechanical control cables routed and retained in the module plate of FIG. 2.
FIG. 3A shows a seat actuator for attaching to the module plate of FIG. 3.
Figures 4, 4B, 4C:
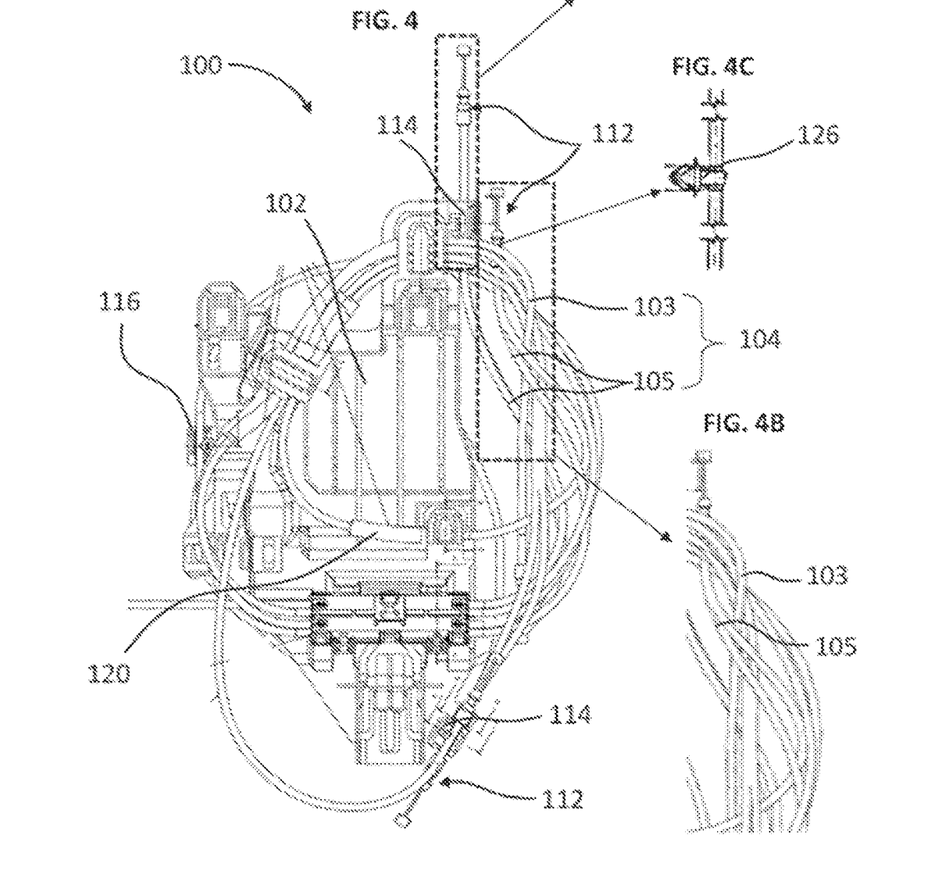
FIG. 4 shows a plan view of the seat module in a pre-assembled state in accordance with an embodiment of the present disclosure.
FIG. 4B shows a detailed view of an end of the mechanical control cable stowed by tucking in the seat module of FIG. 4.
FIG. 4C shows a detailed view of a clip for attaching to the module plate.

In FIG. 2, the module plate 102 further includes a retention feature 110. The retention feature 110 is located in multiple locations of the module plate 102 for retaining the mechanical control cables 104, which are routed and attached to the module plate 102. As shown in FIGS. 2 and 3, the retention features 110 are formed as a mechanical-lock type such as a snap-fit or a press-fit for retaining a portion of the mechanical control cables 104 when each of the mechanical control cables 104 is routed on the module plate 102. The retention feature 110 of the module plate 102 is configured to position the mechanical control cables 104 in a correct location for reducing positioning variation of the mechanical control cables 104 when the seat module 100 is assembled with the seat unit 10. Referring to FIG. 4, each of the mechanical control cables 104 includes an end portion 112 for connecting to the mechanical parts such as levers or latch systems already installed in the seat unit 10 before the seat module 100 is attached. After the seat module 100 is attached to the seat unit 10, the end portion 112 of each of the mechanical control cables 104 is connected to the mechanical parts 16 respectively and the connected mechanical control cables 104 actuate the mechanical parts 16 of the seat unit 10 for controlling the seat movement.

As shown in FIGS. 2, 2A, 2B and 4, the module plate 102 further includes a stowing feature 114 for temporarily retaining the end portion 112 of each of the mechanical control cables 104 in a pre-assembled state where the mechanical control cables 104 are attached (retained) to the module plate 102. In the pre-assembled state of the seat module 100, as shown in FIGS. 1 and 4, the end portions 112 of the routed and attached mechanical cables 104 are temporarily stowed prior to shipment to reduce tangling of the cables 104 and improve assembly process in an assembled state of the seat module 100 where the seat module 100 is securely mounted to the cushion frame 14 of the seat unit 10. In the assembled state of the seat module 100, as shown in FIG. 1, the stowed end portions 112 of the mechanical control cables 104 are released (un-stowed) from the stowing features 114 of the module plate 102 and each connected to the mechanical parts 16 such as the levers and latch systems for the seat actuation as needed.

The stowing feature 114 is formed in at least one location of the module plate. As shown in FIGS. 2 and 4, for example, the stowing features 114 are formed in two locations of the module plate 102. The stowing features 114 are also formed as a mechanical-lock type such as a snap-fit or a press-fit for releasably retaining the end portion 112 of each of the mechanical control cables 104. In the seat module 100, the end portions 112 of the attached mechanical control cables 104 are temporarily retained in the stowing features 114 of the module plate 102 in the pre-assembled state before connecting to the mechanical parts 16 of the seat unit 10. In the assembled state, the seat module 100 is attached to the cushion frame 14 of the seat unit 10 via the mounting features 108 of the module plate 102. While the seat module 100 having the stowed end portions 112 of the mechanical control cables 104 is securely mounted to the seat unit 10, the end portions 112 of the mechanical control cables 104 are retained in the stowing feature 114, and in the assembled state of the seat module 100 after the seat module 100 is mounted to the seat unit 10, the stowed end portions 112 of the mechanical control cables 104 are un-stowed (released) and connected to the mechanical parts 16 such as the levers and latch systems of the seat unit 10.

FIGS. 3 and 4 show examples of the routed and attached mechanical control cables 104 in the pre-assembled state of the seat module 100. When the cable bundle housing 106 with the mechanical control cables 104 is coupled to the module plate 102, the mechanical control cables 104 are routed and attached to the module plate 102. Some cables 103 of the attached mechanical control cables 104 rotate clockwise and the end portions 112 of the cables 103 are temporarily stowed in one of the stowing features 114 of the module plate 102. While the mechanical control cables 104 are attached to the module plate 102, at least one portion of each of the mechanical control cables 104 is held by the retention features 110 formed on the module plate 102. Other cables 105 of the attached mechanical control cables 104 rotate counter-clockwise and also the end portions 112 of the cables 105 are temporarily stowed in one of the stowing features 114 formed in the module plate 102. In addition, as described above, at least one portion of the cables 104 is held by the retention features 110 of the module plate 102.

As shown in FIG. 4, accordingly, the seat module 100 having the mechanical control cables 104 routed and attached to the module plate 102 in the pre-assembled state is configured to prevent the mechanical control cables 104 from tangling and allow the mechanical control cables 104 to be easily connected to the mechanical parts 16 when the seat module 100 is mounted to the seat unit 10 in the assembled state. Specifically, the seat module 100 according to this embodiment reduces the assembly time including the laying work and also the number of the components such as zip-ties or brackets for attaching each of the separate mechanical control cables 104 to the seat unit 10.

Figures 5, 5A:
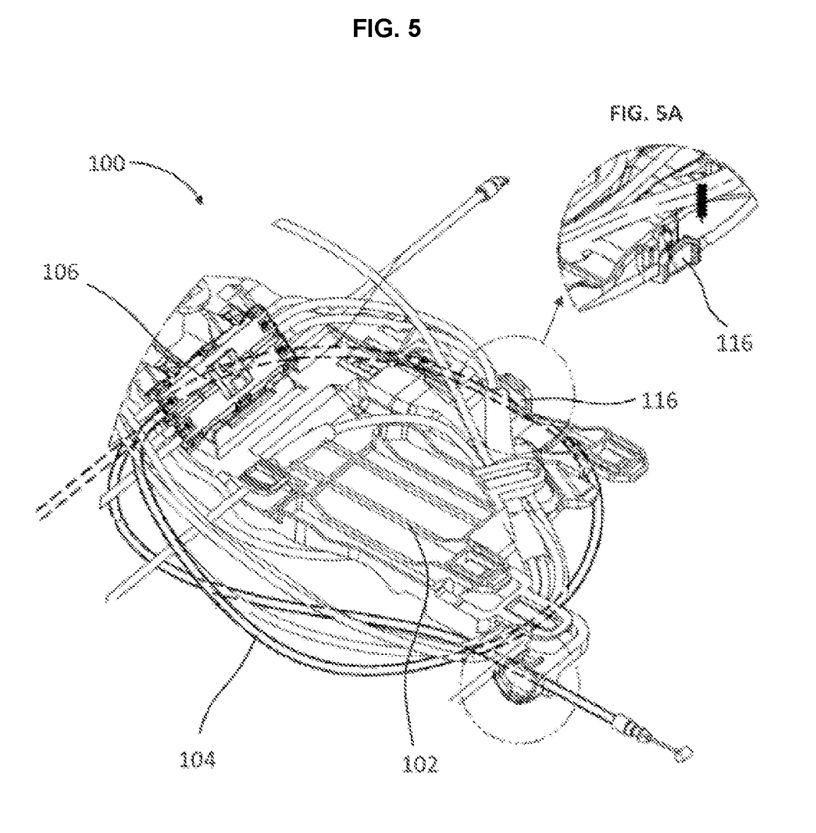
FIG. 5 shows a plan view of a loom protruding from the module plate of FIG. 2.
FIG. 5A shows a detailed view of the loom of FIG. 5.

Referring to FIGS. 5 and 5A, the module plate 102 further includes a loom 116 protruding from a side of the module plate 102. The loom 116 is located in at least one location of the module plate 102 and configured to retain a portion of the mechanical control cables 104. In FIG. 5, one of the attached mechanical control cables 104 is quite long and loops in a complete circle on the underside of the module plate 102. The protruded loom 116 at the side of the module plate 102 is used to retain a portion of the long looped control cable 104. In addition, when there is no place on the upper side of the module plate 102 to accommodate the mechanical control cables 104, the cables 104 are looped on an underside of the module plate 102 (see dashed-lines in FIG. 5) for preventing the tangling of the cables 104 in the pre-assembled state. According to other embodiments of the present disclosure, the loom is configured to temporarily retain a long mechanical control cable for connecting the end portion of the long mechanical control cable to another mechanical part, which is located far from the mounted seat module 100 (ex. an upper side of the seatback frame) such that the protruded loom 116 prevents the attached long mechanical control cables from tangling before mounting to the seat unit 10 in the pre-assembled state and allows the cables to easily release (un-stow) and connect to one of the mechanical parts 16 in the seatback frame in the assembled state.

Figure 4A:
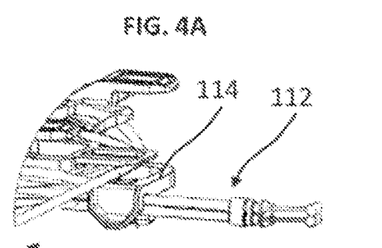
FIG. 4A shows a detailed view of an end of the mechanical control cable stowed by a stowing feature formed in the module plate of FIG. 4.
Figure 4D:
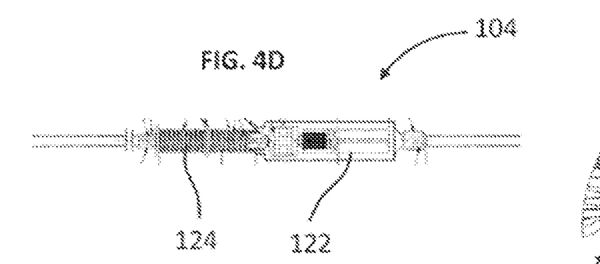
FIG. 4D shows a detailed view of an adjuster and a spring element assembled with the mechanical control cable.

As shown in FIGS. 4 and 4A, the end portions 112 of the mechanical control cables 104 are generally snapped in the stowing features 114 of the module plate 102 for reducing tangling of the mechanical control cables 104 in the pre-assembled state. According to another exemplary embodiment of the present disclosure, a different method for temporarily stowing the end portion 112 of the mechanical control cable 104 is also illustrated in FIGS. 4 and 4B. In the pre-assembled state of the seat module 100, the end portion 112 of one of the mechanical control cables 105 attached to the module plate 102 is temporarily stowed by tucking under or above one of the other cables 103 as shown in FIG. 4B. After the seat module 100 is attached to the seat unit 10, the stowed end of the mechanical control cables 104 by tucking is un-stowed (released) and connected to a predetermined mechanical parts 16 of the seat unit 10 in the assembled state as shown in FIG. 1. Accordingly, in the pre-assembled state of the seat module 100, the end portions 112 of the mechanical control cables 104 are temporarily stowed by either the stowing feature 114 formed on the module plate 102 or tucking under or above the other cables 104 for reducing tangling and improving assembly with the seat unit 10.

In addition, FIG. 4 illustrates the detailed mechanical control cables 104. Each of the mechanical control cables 104 includes a pad 120, an adjuster 122, a spring 124, a clip 126 or any other typical control cable components for controlling the mechanical parts 16 of the seat unit 10. In the seat module 100, accordingly, the assembled mechanical control cables 104 with the control cable components including the pad 120, the adjuster 122, the spring 124, a clip 126, etc. are routed and attached to the module plate 102.

Furthermore, as shown in FIG. 1, the seat module 100 may be applied as a trim surface of the seat unit 10. In FIG. 1, the mounted seat module 100 under the seat cushion is configured to be a part of the trim surface of the lower part of the seat unit 10. In the assembled state, the attached seat module 100 in the seat unit 10 may be a part of the class-A surface such that an original trim piece used in the base of the cushion frame 14 for cosmetic purposes is replaced with the attached seat module 100. Accordingly, the attached module plate 102 having the mechanical control cables 104 under the cushion is used as the class-A surface of the seat unit 10, so that it effectively reduces the weight and assembly time including the manufacturing costs.

Figure 6:
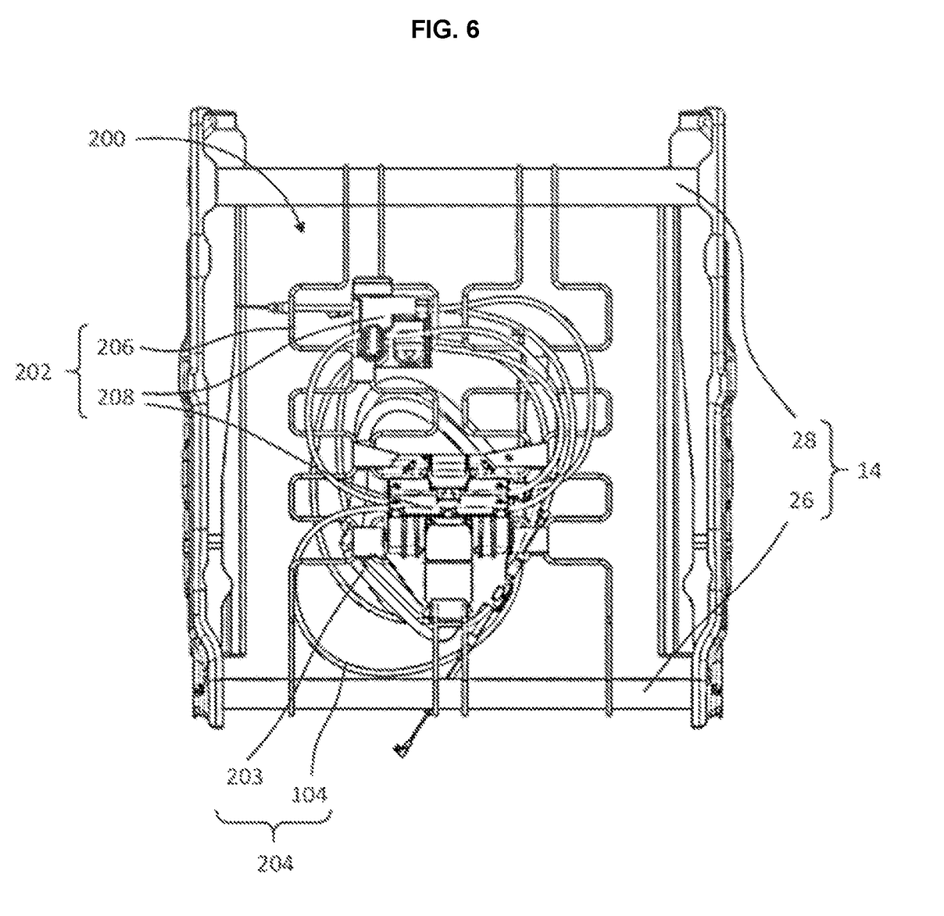
FIG. 6 shows a plan view of a seat module attached to a cushion frame in an automotive seat in accordance with the second embodiment of the present disclosure.

FIG. 6 shows another embodiment of a seat module according to the preset disclosure. In FIG. 6, the seat module 200 includes a cushion suspension module 202 and at least one operating cable 204. The cushion suspension module 202 is configured to support a cushion of the seat unit 10 (see FIG. 1), and includes a plurality of cushion suspension wires 206 for attaching to the cushion frame 14 and at least one module plate 208 which is coupled with the cushion suspension wires 206 for attaching the operating cables 204. Further, the cushion suspension module 202 is generally mounted to a front cross tube 26 and a rear cross tube 28 attached to the cushion frame 14. As shown in FIG. 6, more than one operating cables 204 are retained into one of the module plate 208. The operating cables 204 include wire harnesses 203 for electrical communication with electrical parts and mechanical control cables 104 for actuating the mechanical parts 16. According to other embodiments of the present disclosure, the operating cables 204 may include other types of cables to electrically or mechanically activate other devices attached to the seat unit.

Figure 7:
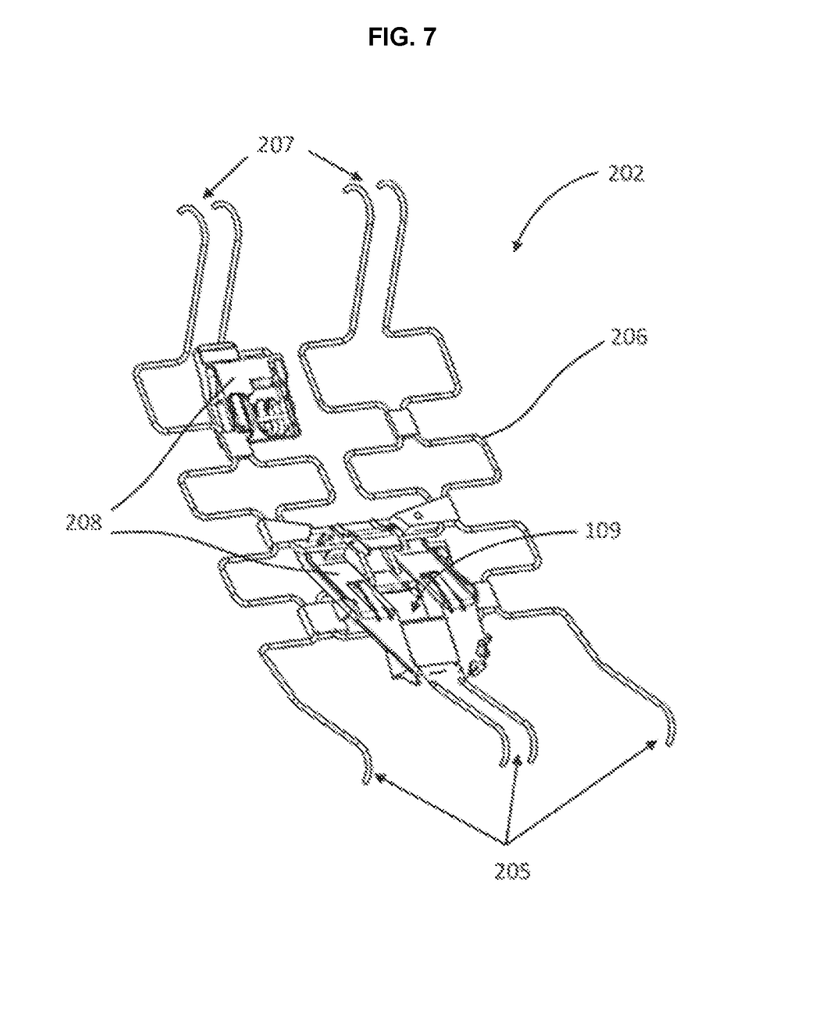
FIG. 7 shows a perspective view of a cushion suspension module in the seat module of FIG. 6.

For example, FIG. 7 illustrates the cushion suspension module 202 having the plurality of cushion suspension wires 206 and two module plates 208, which is designed to fit within the given packaging space under the seat cushion and fixed to the cushion frame 14 of the seat unit 10 (see also FIG. 1). The structure, dimension, shape, and number of pieces, etc. of the cushion suspension wires 206 and the module plate 208 are not particularly limited and are changed based on the given packaging space under the seat cushion. In addition, the cushion suspension wires 206 are generally made of a steel material. The steel material is not particularly limited, and various steel materials may be used. Further, the module plates 208 in the second embodiment of the present disclosure are also made of a resin material or a composite material, which is same material as the module plate 102 in the first embodiment of the present disclosure. Accordingly, as described above, the cushion suspension module 202 having the cushion suspension wires 206 and the module plates 208 structurally supports the cushion of the seat unit 10 in addition to providing the organized operating cables 204 (see FIG. 1).

In the exemplary embodiment of FIGS. 6 and 7, the cushion suspension module 202 of the seat module 200 is attached to the cushion frame 14 via the cushion suspension wires 206. Each of the cushion suspension wires 206 has a front end 205 and a rear end 207, which are each attached to the front cross-tube 26 and the rear cross-tube 28 of the cushion frame 14. Generally, the front and rear ends 205 and 207 of the cushion suspension wires 206 are formed with a curved shape along the outer circumference of the front and rear cross-tubes 26 and 28, and generally attached to the cross-tubes 26 and 28 (e.g., a snap-fit manner), respectively. The attachment location or method of the cushion suspension module 202 is not particularly limited and is changed based on the cushion frame structure of the seat unit 10. Due to the cushion suspension wires 206, the seat module 200 is securely mounted to the cushion frame 14 of the seat unit 10. Further, the ends 205 and 207 of the cushion suspension wires 206 are dipped or overmolded with plastic to prevent noise.

The module plates 208 are each attached a location of the cushion suspension wires 206 to form the cushion suspension module 202. As shown in FIGS. 6 and 7, two module plates 208 are coupled to two different locations of the cushion suspension wires 206 by various attachment methods (e.g., over-molding) and retain the operating cables 204 before the cushion suspension module 202 is attached to the cushion frame 14. Further, the module plates 208 in the second embodiment of the present disclosure may be formed with a mounting feature for attaching to the cushion frame 14 as described in the first embodiment of the present disclosure (see FIG. 2). In addition, as shown in FIGS. 6 and 7, the module plates 208 also include the holding feature 109 for additional components such as the seat actuator 118 (e.g., a power folding actuator (see FIG. 3A)) for electronically adjusting the seat position.

Figure 8:
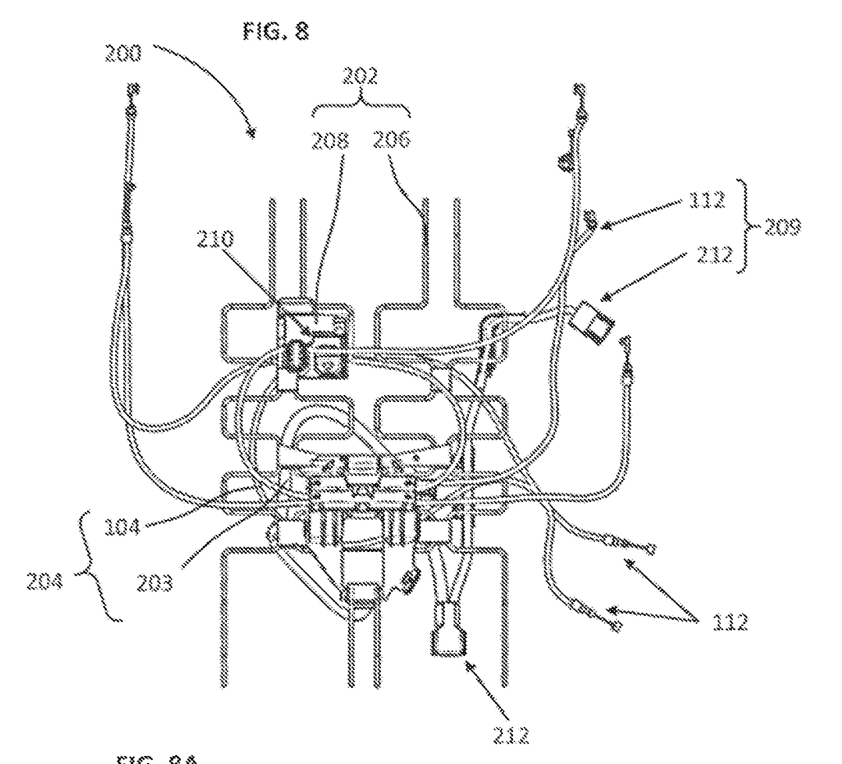
FIG. 8 shows a plan view of operating cables routed and retained in the cushion suspension module of FIG. 7.
Figure 8A:
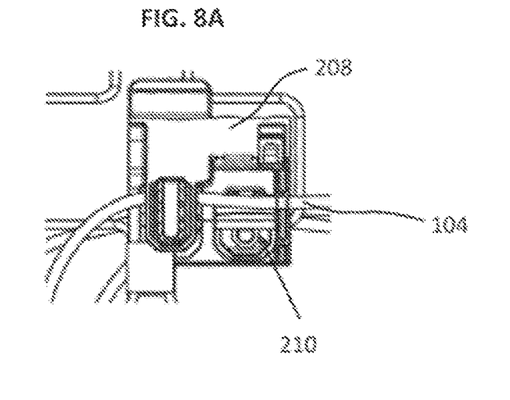
FIG. 8A shows a detailed view of a portion of the operating cables retained in a retention feature of FIG. 8.

Referring to FIGS. 8 and 8A, each of the module plates 208 includes a retention feature 210, which is located in multiple locations of the module plates 208 for retaining the operating cables 204 routed and attached to the module plates 208. The retention features 210 are formed as a mechanical-lock type such as a snap-fit or a press-fit for permanently retaining a portion of the operating cables 204, which is the same retention feature as the first embodiment of the present disclosure. The retention features 210 formed in the module plates 208 are configured to position the operating cables 204 in a proper (or correct) location for reducing positioning errors of the operating cables 204 when the seat module 200 is assembled with the seat unit 10 and the operating cables 204 are each connected to the devices 24 which are pre-installed (pre-attached) into the seat unit 10.

Figure 10A:
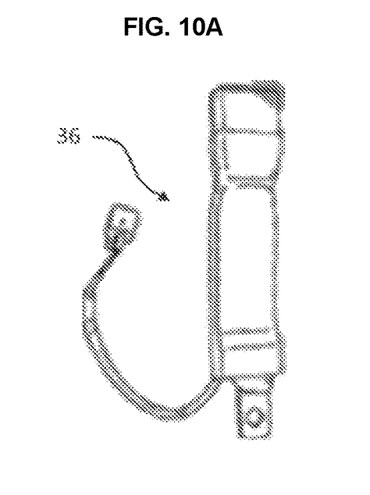
FIG. 10A shows a seatbelt buckle for a seat unit.
Figure 10B:
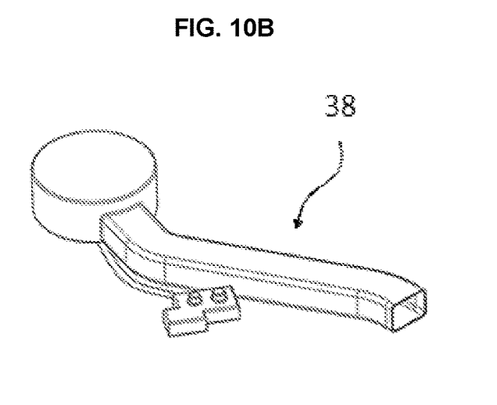
FIG. 10B shows a blower assembly for a seat unit.
Figure 10C:
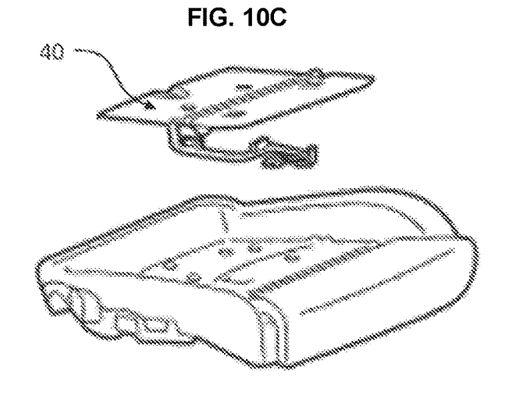
FIG. 10C shows a heating device for a seat unit.

As shown in FIG. 8, the operating cables 204 includes the mechanical control cables 104 and the wire harnesses 203. The mechanical control cables 104 include the end portion 112 for connecting to the mechanical parts 16 (e.g., mechanical actuators) such as levers or latch systems attached and used in the seat unit 10. Further, as shown in FIG. 8, the wire harnesses 203 include a harness end portion 212 for electrically connecting to the electrical parts including various power systems and sensors (e.g., a buckle sensor 36 (FIG. 10A), a blower system 38 (FIG. 10B), a heating device 40 (see FIG. 10C), a seat occupant sensor, or an electric motor, etc.), which are attached or used in the seat unit 10. After the seat module 200 is attached to the seat unit 10, the end portion 112 of the mechanical control cables 104 and the harness end portion 212 of the wire harnesses 203 are each connected to the mechanical and electrical parts respectively, and the operating cables 204 mechanically and/or electrically actuate the devices 24 attached to the seat unit 10.

Figures 9, 9A:
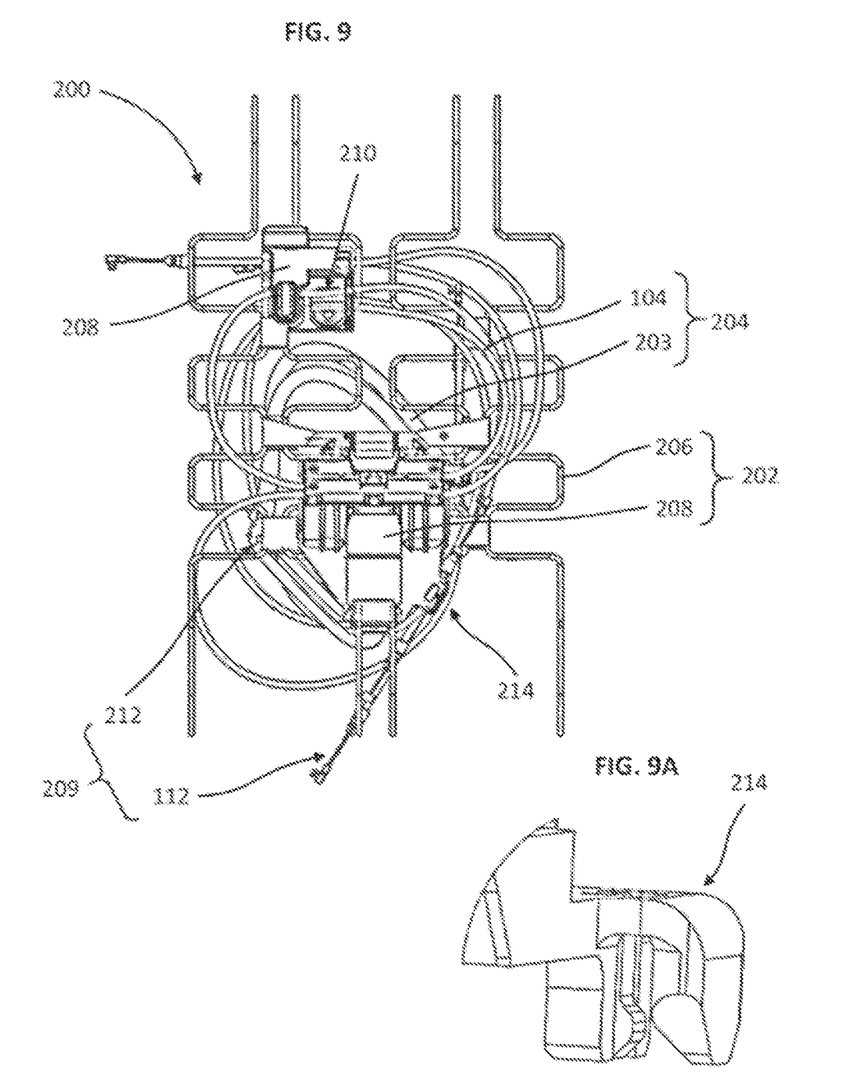
FIG. 9 shows a plan view of the seat module in a pre-assembled state of FIG. 6.
FIG. 9A shows a detailed view of a stowing feature formed in the cushion suspension module of FIG. 9.

As shown in FIGS. 6, 9, and 9A, the module plates 208 further include a stowing feature 214 for temporarily retaining end portions 209 of the operating cables 204 (the end portions 112 of the mechanical control cable 104 and the harness end portion 212 of the wire harnesses 203) in a pre-assembled state where the operating cables 204 are attached and retained to the retention features 210 of the cushion suspension module 202, which is defined as a seat module subassembly. In the pre-assembled state of the seat module 200, as shown in FIG. 9, the end portions 209 of the routed and attached operating cables 204 are temporarily stowed prior to shipment to reduce tangling of the operating cables 204 and improve assembly process in an assembled state of the seat module 200 where the seat module 200 is securely mounted to the cushion frame 14 including the front and rear cross-tubes 26 and 28. Further, in the assembled state of the seat module 200, as shown in FIG. 6, the stowed end portions 209 of the operating cables 204 are released (unstowed) from the stowing feature 214 of the module plates 208 and each connected to the devices 24 which are pre-installed in the seat unit 10.

As shown in FIGS. 9, and 9A, the stowing features 214 are located in at least one location of each of the module plates 208, and the stowing features 214 are formed as the mechanical-lock type for releasably retaining the end portions 209 of the operating cables 204. Further, in the seat module 200, the end portions 209 of the attached operating cables 204 are temporarily retained in the stowing feature 214 of the cushion suspension module 202 (or the module plates 208) in the pre-assembled state before connecting to the devices 24 of the seat unit 10. In the assembled state, the seat module 200 is attached to the cushion frame 14 of the seat unit 10 via the cushion suspension wires 206 of the cushion suspension module 202. While the seat module 200 having the stowed end portions 209 of the operating cables 204 are retained in the stowing features 214, and in the assembled state of the seat module 200 after the seat module 200 is attached to the seat unit 10, the stowed end portions 209 of the operating cables 204 are un-stowed (released) and connected to the devices 24 including the mechanical parts 16 and the electrical parts, which are attached to the seat unit 10.

FIG. 9 shows an example of the routed and attached operating cables 204 as the preassembly of the seat module 200. The operating cables 204 including the mechanical control cables 104 and the wire harnesses 203 are each routed in the clockwise or counter-clockwise direction on the cushion suspension module 202 and the end portions 209 of the operating cables 204 are temporarily stowed in one of the stowing features 214 formed in the module plates 208. Accordingly, the seat module 200 including the routed and stowed operating cables 204 in the pre-assembled state is configured to prevent the operating cables 204 from tangling and allow the operating cables 204 to be easily connected to the devices 24 when the seat module 200 is attached to the seat unit 10 in the assembled state. Further, the seat module 200 reduces the assembly time including the laying work and also the number of the component such as zip-ties or brackets for attaching each of the operating cables 204 to the seat unit 10.

Also, the module plates 208 in the second embodiment of the present disclosure may include a loom protruding from a side of the module plates 208, which is configured to retain a portion of the operating cables 204 (see FIGS. 5 and 5A). In the pre-assembled state of the seat module 200, the end portions 209 of the operating cables 204 are temporarily stowed by tucking under or above a portion of the operating cables 204 routed and retained to the cushion suspension module 202 (see FIG. 9) such that it reduces tangling of the operating cables 204 and improves the assembly steps and time of the seat unit 10. Further, the end portions 209 of the operating cables 204 may be temporarily stowed by tucking under or above a location of the cushion suspension wires 206. As described above, the cushion suspension module 202 with the operating cables 204 mounted under the cushion may be used as the class-A surface of the seat unit 10 such that it effectively reduces the weight, assembly process, and manufacturing cost of the seat unit 10.

While the above description constitutes the preferred embodiments of the present invention, it will be appreciated that the invention is susceptible to modification, variation and change without departing from the proper scope and fair meaning of the accompanying claims.

What is claimed is:

1. A seat module adapted to be attached to a seat having at least one device for seat operation in a motor vehicle, the seat module comprising:
   at least one operating cable configured to activate the at least one device; and
   a cushion suspension module adapted to support a cushion of the seat, the cushion suspension module including:
      a plurality of cushion suspension wires for attaching to the seat, and
      at least one module plate coupled with the plurality of cushion suspension wires, the at least one module plate formed with a retention feature for attaching the at least one operating cable,
   wherein an end portion of the operating cable is temporarily stowed on the cushion suspension module in a pre-assembled state where the operating cable is attached to the cushion suspension module, and the end portion of the operating cable is connected to the at least one device attached to the seat in an assembled state where the cushion suspension module with the retained operating cables is securely mounted to the seat.

2. The seat module of claim 1, wherein the end portion of the operating cable stowed in the pre-assembled state is retained in the module plate while the cushion suspension module is mounted to the seat, and is released for connecting to the at least one device attached to the seat in the assembled state of the cushion suspension module.

3. The seat module of claim 1, wherein the retention feature is formed as a mechanical-lock type and located in at least one location of the module plates for retaining the operating cables.

4. The seat module of claim 1, wherein the retention feature of the module plate is configured to position each of the operating cables in a pre-defined location of the seat in the assembled state.

5. The seat module of claim 1, wherein the cushion suspension module includes a stowing feature formed in at least one location of the module plate for temporarily retaining the end portion of the operating cables in the pre-assembled state and allowing the end portion of the operating cables to be released for connecting to the devices attached to the seat in the assembled state.

6. The seat module of claim 5, wherein the stowing feature is formed with a mechanical-lock type for releasably retaining the end portion of the operating cables.

7. The seat module of claim 1, wherein the end portion of the operating cables is temporarily stowed by tucking under or above one of the operating cables retained in the cushion suspension module in the pre-assembled state.

8. The seat module of claim 1, wherein the operating cables include at least one wire harness for electrical communication with an electric device and/or at least one mechanical control cable for actuation of a mechanical part.

9. The seat module of claim 8, wherein each of the mechanical control cables controls mechanical actuators such as a lever and/or a latch mechanism.

10. The seat module of claim 8, wherein each of the wire harnesses electrically communicates with a seat buckle, a seat occupant sensor, an electronic circuit unit (ECU), a heating device, and/or a blower assembly.

11. The seat module of claim 1, wherein the module plate is formed of a resin material or a composite material such as a glass woven plastic composite sheet.

12. The seat module of claim 1, wherein the seat module further includes an additional component retained in the cushion suspension module for actuating a power mechanism of the seat.

13. A method for producing a motor vehicle seat structure having at least one device for seat operation, the method comprising the step of:
   providing at least one operating cable;
   providing a cushion suspension module adapted to be attached to a portion of the seat structure;
   coupling the at least one operating cable to the cushion suspension module;
   stowing an end portion of the operating cable in at least one location of the cushion suspension module, thereby producing a seat module subassembly defined as a pre-assembled state of the seat module;
   attaching the seat module subassembly to a portion of the seat structure defined as an assembled state;
   releasing the stowed end portion of the operating cable from the cushion suspension module in the assembled state; and
   connecting the end portion of the operating cable to the at least one device of the seat.

14. The method of claim 13, wherein the step of providing the cushion suspension module includes the steps of:
   providing a plurality of cushion suspension wires; and
   coupling at least one module plate with the plurality of cushion suspension wires.

15. The method of claim 14, wherein the plurality of cushion suspension wires of the cushion suspension module are adapted to be attached to a front and a rear cross-tube of the seat structure.

16. The method of claim 14, wherein the at least one module plate is coupled with the plurality of cushion suspension wires by an over-molding process.

17. The method of claim 13, wherein the end portion of the operating cable is temporarily stowed and retained in a stowing feature of the cushion suspension module in the seat module subassembly.

18. The method of claim 13, wherein the cushion suspension module includes a retention feature formed as a mechanical-lock type and located in the at least one location of the cushion suspension module for coupling at least one portion of the operating cables.

19. The method of claim 13, wherein the operating cables include at least one wire harness for electrical communication with an electric device and/or at least one mechanical control cable for actuation of a mechanical part.

20. The method of claim 13, further comprising the step of tucking temporarily the end portion of the operating cable under or above one of the operating cables coupled with the cushion suspension module in the seat module subassembly.

* * * * *